United States Patent
DeRosa

(10) Patent No.: US 7,215,600 B1
(45) Date of Patent: May 8, 2007

(54) ANTENNA ARRANGEMENT FOR AN ELECTRONIC DEVICE AND AN ELECTRONIC DEVICE INCLUDING SAME

(75) Inventor: Ronald J. DeRosa, New Haven, CT (US)

(73) Assignee: Timex Group B.V. (NL)

( * ) Notice: Subject to any disclaimer, the term of this patent is extended or adjusted under 35 U.S.C. 154(b) by 0 days.

(21) Appl. No.: 11/519,636

(22) Filed: Sep. 12, 2006

(51) Int. Cl.
*G04B 47/00* (2006.01)
*G04C 11/02* (2006.01)
*H01Q 1/12* (2006.01)

(52) U.S. Cl. .......................... 368/10; 368/47; 368/88; 368/278; 343/718; 343/767

(58) Field of Classification Search ............ 368/10, 368/47, 88, 78; 343/718, 767
See application file for complete search history.

(56) References Cited

U.S. PATENT DOCUMENTS

| | | | |
|---|---|---|---|
| 3,426,298 A | | 2/1969 | Sontheimer et al. |
| 3,624,536 A | | 11/1971 | Norton |
| 3,891,934 A | | 6/1975 | Norton et al. |
| 4,769,656 A | * | 9/1988 | Dickey .................. 343/718 |
| 5,072,231 A | | 12/1991 | Koyama |
| 5,589,840 A | * | 12/1996 | Fujisawa .................. 343/718 |
| 5,946,610 A | * | 8/1999 | Hama .................. 455/351 |
| 6,028,555 A | | 2/2000 | Harano |
| 6,104,354 A | | 8/2000 | Hill et al. |
| 6,130,647 A | * | 10/2000 | Zurcher et al. ............. 343/767 |
| 6,154,177 A | | 11/2000 | Saito et al. |
| 6,373,439 B1 | * | 4/2002 | Zurcher et al. ............. 343/718 |
| 6,724,690 B1 | * | 4/2004 | Endo et al. .................. 368/10 |
| 6,804,561 B2 | | 10/2004 | Stover |
| 2005/0018543 A1 | | 1/2005 | Fujisawa |
| 2005/0054321 A1 | * | 3/2005 | Casagrande et al. ........ 455/351 |
| 2005/0219955 A1 | * | 10/2005 | Xu et al. ...................... 365/88 |
| 2006/0109188 A1 | * | 5/2006 | Ikeda et al. ................. 343/718 |

FOREIGN PATENT DOCUMENTS

JP 54-107771 8/1979
JP 2004-212083 7/2004

* cited by examiner

*Primary Examiner*—Vit Miska
(74) *Attorney, Agent, or Firm*—Carmody & Torrance LLP

(57) ABSTRACT

A wristworn device comprising a radio communication device for receiving from and/or transmitting signals to a radio communication device external to the wristworn device. In at least one embodiment, the casing comprises a metallic watchcase having a slot, and wherein the watchcase is electrically coupled to the radio communication device to function as the antenna. In another embodiment, a metallic loop is provided in the casing proximate the watchcase, wherein the metallic loop is electrically coupled to the radio communication device to function as the antenna and the watchcase comprises a slot and functions as an element for the reception and/or transmission of electromagnetic radiation. In a third embodiment, the metallic watchcase does not have a slot and the watchcase is electrically coupled to the radio communication device to function as the antenna.

28 Claims, 1 Drawing Sheet

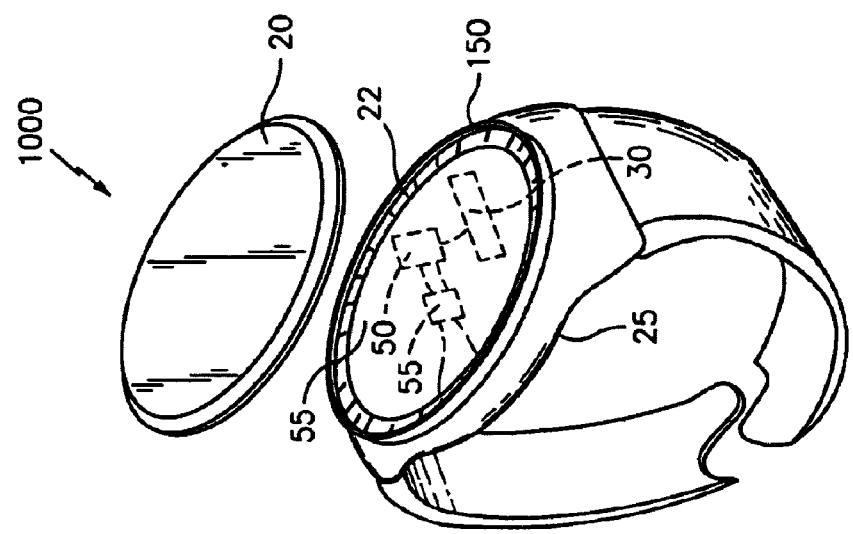
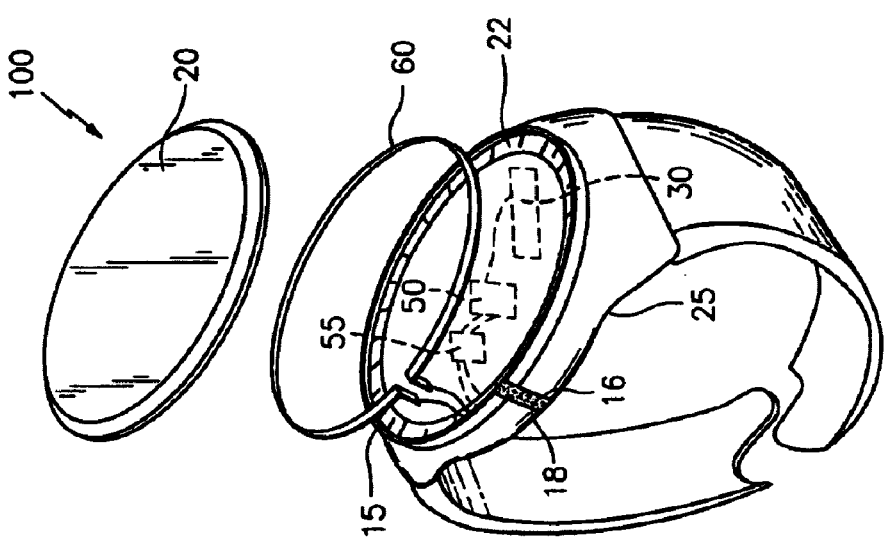
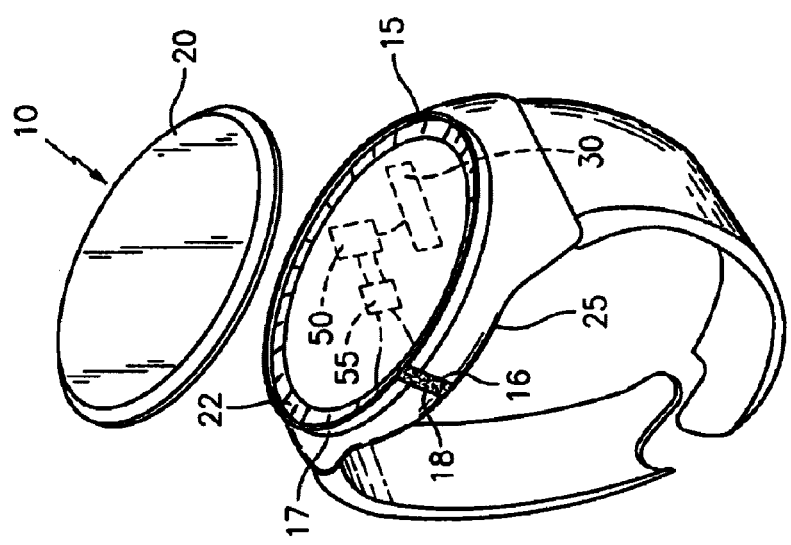

ANTENNA ARRANGEMENT FOR AN ELECTRONIC DEVICE AND AN ELECTRONIC DEVICE INCLUDING SAME

BACKGROUND OF THE INVENTION

The present invention relates generally to antennas, and in particular, to an improved antenna for a wristworn device having signal transmitting and/or receiving capabilities. In exemplary embodiments, the wristworn device is a timepiece such as a wristwatch, but, as will become quite clear below, a timepiece or wristwatch is only by way of example and not limitation. In particular, the invention is primarily directed to improved signal transmission and reception within a metal casing, such as a casing for a timepiece.

The prior art is full of examples of antennas associated with wristworn devices, such as wristwatches. As would be well known to those skilled in the art, loop antennas are particularly advantageous due to their size and directivity, as it is well known that a loop antenna is desirable since it has a geometry that essentially "pulls in" signals from 360 degrees (i.e. from all different azimuths and orientations). For example, U.S. Pat. Nos. 5,072,231; 6,104,354; 6,028,555 and 6,154,177 are but just a few examples of devices incorporating loop antennas for signal reception and transmission. While these arrangements may have been satisfactory for their intended uses, they all are perceived to be deficient in various respects.

The use of loop antennas for signal reception and transmission has been found to be particularly desirable in devices, such as timepieces. However, use of a loop antenna in a metal case, such as a watch casing, has been found to have drawbacks and to be less than optimal, typically because of the poor performance due to the shielding of the antenna by the metal case itself. Additionally, electro-static discharge (ESD) is also a known problem when using a metal casing.

Introducing a slot in the case to improve signal reception or transmission is known. For example, the inventor is aware of at least one device that had therein an RFID transmitter/receiver, which incorporated a slotted casing. However, this known example utilizes a coil antenna with a ferrite core, which doesn't provide a desirable distance communication range. Moreover, the use of coil antennas in such devices are limited to short range (e.g. 1–2 feet) communications, which are less than desirable in the communications contemplated by the present invention.

With all of the known obstacles related to shielding and performance of a loop antennas in a metal casing, it is believed that the prior art designs have been less than effective in incorporating a loop antenna into a device having a metal casing. Even more remote is the idea of using the metal casing itself as the loop antenna. However, as discussed below, the present inventor has recognized that when a slotted casing is used as the actual antenna or when the loop is placed underneath and the case is used a "re-radiator," signal reception/transmission performance is significantly improved.

OBJECTIVES AND SUMMARY OF THE INVENTION

Therefore, it is generally an object and advantage of the present invention to provide an improved antenna arrangement for a device comprising a metal casing.

It is still a further object and advantage of the present invention to provide an improved antenna arrangement for a wristworn device having improved signal transmission and reception functionality.

It is another object and advantage of the present invention to provide an improved antenna arrangement for a wristworn timepiece that incorporates therein a receiver, transmitter and/or transceiver.

It is yet another object of the present invention is to provide an improved antenna arrangement for a wristworn device that reduces the number of components of the device yet provides satisfactory or even improved signal reception and/or transmission.

Yet another object and advantage of the present invention is to provide an improved antenna arrangement that reduces ESD.

Further objects and advantages of this invention will become more apparent from a consideration of the drawings and ensuing description.

The invention accordingly comprises the features of construction, combination of elements, arrangement of parts and methodology of construction that will be exemplified in the disclosure hereinafter set forth, and the scope of the invention will be indicated in the claims.

To overcome the perceived deficiencies in the prior art and to achieve the objects and advantages above and below, the present invention, generally speaking, is directed to a wristworn device comprising a radio communication device for at least one of receiving signals from and transmitting signals to a radio communication device external to the wristworn device.

In a first embodiment, the wristworn device comprises a casing comprising a metallic watchcase, a crystal that seals a first end of the watchcase and a case back that seals a second end of the casing; controller means disposed in said casing and operatively coupled to the radio communication device, and wherein the watchcase comprises a slot, and wherein the watchcase is electrically coupled to the radio communication device to function as the antenna for at least one of reception or transmission of signals for the radio communication device.

In a second embodiment, the wristworn device comprises a casing comprising a metallic watchcase, a crystal that seals a first end of the watchcase and a case back that seals a second end of the casing; controller means disposed in said casing and operatively coupled to the radio communication device, a metallic loop provided in the casing proximate the watchcase, wherein the metallic loop is electrically coupled to the radio communication device to function as the antenna for at least one of reception or transmission of signals for the radio communication device; and wherein the watchcase comprises a slot and functions as an element for the reception and/or transmission of electromagnetic radiation.

In a third embodiment, the wristworn device comprises a casing comprising a metallic watchcase, a crystal that seals a first end of the watchcase and a case back that seals a second end of the casing; controller means disposed in said casing and operatively coupled to the radio communication device, and wherein the watchcase is electrically coupled to the radio communication device to function as the antenna for at least one of reception or transmission of signals for the radio communication device.

BRIEF DESCRIPTION OF THE DRAWINGS

The above set forth and other features of the invention are made more apparent in the ensuing Description of the Preferred Embodiments when read in conjunction with the attached Drawings, wherein:

FIG. 1 is an exploded perspective view of the present invention in accordance with a first embodiment;

FIG. 2 is an exploded perspective view of the present invention in accordance with a second embodiment; and FIG. 3 is an exploded perspective view of the present invention in accordance with a third embodiment.

Like reference numbers are used for like parts, although not every feature is numbered in each figure.

DETAILED DESCRIPTION OF THE PREFERRED EMBODIMENTS

Reference shall be first made FIG. 1 and the following disclosure, which depicts and discloses a wristworn device, generally indicated at 10, constructed in accordance with a first embodiment of the present invention.

In a preferred embodiment, device 10 is a wristworn device, and preferably a timepiece. However, as indicated above, device 10 need not be limited to a timepiece or wristwatch, and may be a variety of other devices, such as a heart rate monitor, glucose monitor or other communication device, examples of which are disclosed in Published Application Serial No. 2004/0233788 (the '788 Published Application), which is hereby incorporated by reference in its entirety.

As illustrated in FIG. 1, device 10 preferably comprises a metal watchcase 15, a glass or plastic transparent watch crystal 20 that allows viewing of a watch dial 22, a case back 25 and a watch movement generally indicated at 30 that contains the electrical and mechanical mechanisms for timekeeping, including hand movement. A battery (not shown) is also provided. Watch dial 22 provides for the display of information in an analog or digital fashion. An audible indicator may also be provided. As will be true for all the figures, it should be apparent that dial 22 is "under" the crystal 20 and that controller means 30 (i.e. and the movement) is preferably "under" the dial 22.

As disclosed in the aforementioned '788 Published Application, an "analog fashion" of display typically comprises the use of hands, while a "digital fashion" display typically consists of an LED, LCD, a dot matrix or a variety of the new display technologies that display information without the use of indicator hands.

As is also well-known in the art, controller means/movement 30 for device 10 (e.g. a watch movement") usually comprises a printed circuit board that contains a microcontroller, and/or discreet semiconductor devices and/or an application specific integrated circuit (ASIC) to perform timekeeping and communications functions. Controller means/movement 30 may also comprise one or more (e.g. stepping) motors for the rotation of the indicator (e.g. hour/minute, display) hands. Similarly, the controller means or "movement" may comprise a digital display for the display of data in the "digital fashion" format. In either "movement," a battery (not shown) and frame (not shown) are provided to hold the mechanism together as one unit. Disclosure of a suitable controller and other hand movement components for the present invention is provided in the '788 Published Application and incorporated by reference herein. To be clear, the phrase "controller means" is intended to comprehensively encompass all the circuitry, software and hardware to communicate with the communication device 50 which will be hereinafter disclosed, which in turn communicates with the external communication device. Moreover, the "controller means" is intended to also include all the hand rotation signaling and functionality to carry out the objectives set forth herein and made apparent hereby.

In accordance with the present invention, device 10 comprises a radio communication device, generally indicated at 50, such as a transmitter, a receiver and/or a transceiver. Device 50 is preferably mounted on the printed circuit board and usually interfaces to the microcontroller (not shown) of the controller means 30. Data is transferred to or from radio communication device 50 for the purpose of data display, data storage and/or control, all as is well known in the art.

Metal watchcase 15 includes a slot 16 in the circumference which creates a broken circular loop 17. Slot 16 is preferably filled with a nonmetallic material 18, such as plastic by injection molding, to minimize water and debris infiltration into the casing 15. For aesthetic reasons, slot 16 may be provided proximate the crown. In the preferred embodiment, the loop is in fact circular, but as would be understood by those skilled in the art, the loop can also be other shapes such as a square broken loop in a device with a square watch case.

The break in metal watchcase 15 that creates a circular loop forms an electric field type loop antenna that is connected to radio communication device 50. To maximize the exchange of electromagnetic energy between the antenna 17 thus formed and radio communication device 50, a tuning network 55 comprising inductors and/or capacitors, as would be known to those skilled in the art, is preferably placed between antenna 17 and device 50.

As can thus be seen in this first embodiment, the novelty of loop antenna 17 is the use of metal watchcase 15 therefor. The loop configuration created by slot 16 in the casing creates a form factor that efficiently radiates energy and receives radiated energy.

Metal in proximity of the loop 17 depending on its orientation and continuity can affect the ability of the performance of antenna 17. Since any deviation from the loop form factor such as the addition of a metal case back would detract from the ability of antenna 17 to radiate waves or receive radiated waves, case back 25 preferably comprises a form factor that maintains the loop configuration. This is achieved by using a non metallic case back such as glass, ceramic and/or plastic which do not significantly impede radiation. However, the case back 25 can also be comprised of a nonmetallic material in the center of the case back and a metallic material on the perimeter of the case back, effectively maintaining the loop configuration. Likewise, dial 22 should also be configured from nonmetallic material to minimize any negative effects on transmission or reception. Again, for purposes of simplicity, no significant detail is provided for dial 22, although it should be clear that conventional dials with, for example, numerical indicia, are contemplated herein.

Reference is now made to FIG. 2 in connection with the following disclosure, which depicts and discloses a wristworn device, generally indicated at 100, constructed in accordance with a second embodiment of the present invention.

In this preferred embodiment, device 100 is likewise preferably a wristworn device, and preferably a timepiece. However, as indicated above with respect to device 10, device 100 need not be limited to a timepiece or wristwatch, and may be a variety of other devices, such as those disclosed above.

Similar to device 10, device 100 also preferably comprises metal watchcase 15, glass or plastic transparent watch crystal 20, case back 25, a dial 22, a controller means/watch movement 30 such as that disclosed above, and radio communication device 50 that is coupled to the controller means. Again, the controller means may comprise a controller such as that disclosed in the aforementioned '788 Published Application, the subject matter of which is incorporated herein by reference. The design and construction of the foregoing features are similarly constructed. For example, watchcase 15 of this second embodiment also preferably comprises a slot 16 in the circumference which creates a broken circular loop, with slot 16 also preferably filled with a nonmetallic material 18, such as plastic, to minimize water and debris infiltration into the casing. Again, while the preferred shape of the loop is circular, this is by example and not limitation.

This second embodiment most significantly differs from the first embodiment by its inclusion of a metallic loop 60 placed within the circumference of metal watchcase 15. This metallic loop 60 forms an electric field type loop antenna and is electrically coupled to radio communication device 50. In this implementation, loop 60 acts as the primary antenna, and metal watchcase 15 acts as a re-radiator element. Electrical energy is efficiently transferred from inner loop 60 to metal watchcase 15 because the two loops, namely loop 60 and watchcase 15 are in close proximity to each other and therefore closely coupled.

To maximize the exchange of electromagnetic energy between metallic loop 60 and radio communication device 50, a tuning network 55, comprising inductors and/or capacitors, is placed between metallic loop 60 and device 50. Metal watchcase 15 can be tuned with inductors and/or capacitors or be left un-tuned depending on the desired antenna characteristics particular for each design.

As will thus be appreciated, this second embodiment provides for the use of metal watchcase 15 as a re-radiator, along with metallic loop 60 as the antenna. The loop configuration created by slot 16 in watchcase 15 and metallic loop 60 creates a form factor that efficiently radiates energy and receives radiated energy.

As with the first embodiment, metal in proximity of loop 60 depending on its orientation and continuity can affect the ability of its performance as an antenna. Thus, as with the first embodiment, case back 25 comprises a form factor that maintains the loop configuration. Here again, this may be achieved by using a non metallic case back such as glass, ceramic and/or plastic which do not significantly impede radiation. On the other hand, it can likewise also be comprised of a nonmetallic material in the center of the case back and a metallic material on the perimeter of the case back, thereby effectively maintaining the loop configuration.

In yet an alternative to this second embodiment, case 15 may be non-metallic (e.g. plastic).

Reference is now made to FIG. 3 in connection with the following disclosure, which depicts and discloses a wristworn device, generally indicated at 1000, constructed in accordance with yet a third embodiment of the present invention.

In this preferred embodiment, device 1000 is likewise preferably a wristworn device, and preferably a timepiece. However, as indicated above with respect to device 10 and 100, device 1000 need not be limited to a timepiece or wristwatch, and may be a variety of other devices, such as those disclosed above and in the '788 Published Application.

Similar to devices 10 and 100, device 1000 also preferably comprises a metal watchcase, glass or plastic transparent watch crystal 20, a dial 22, a case back 25, controller means/watch movement 30 such as that disclosed above, and radio communication device 50 coupled to controller means 30. The design and construction of the foregoing features are similarly constructed.

This third embodiment most significantly differs from the foregoing first two embodiments by providing a continuous metal case 150 (i.e. there is no slot as defined and illustrated above, provided in the watchcase). Watchcase 150 may be circular or square, by way of example and not limitation.

In this embodiment, radio communications device 50 is coupled/fed into two points of the metal watchcase 150. By optimum selection of these two feed points with respect to resistance and reactance of the watch case at the frequency or range of frequencies at which radio device 50 operates, watchcase 150 becomes an electric field type loop antenna. To maximize the exchange of electromagnetic energy between the antenna 150 and radio communication device 50, a tuning network 55 consisting of inductors and/or capacitors is coupled therebetween.

The loop configuration created by the selected feed points and tuning network creates a form factor that efficiently radiates energy and receives radiated energy. The unique approach with this third embodiment is the optimum match of radio device 50 to metal watchcase 150, which becomes a radiating element.

Similar to the first two embodiments, metal in proximity of the loop depending on its orientation and continuity can affect the ability of the loop performance. And, since any deviation from the loop form factor such as the addition of a metal case back would detract from the loop's ability to radiate waves or receive radiated waves, case back 25 is comprised of a form factor that maintains the loop configuration. This is achieved most easily by using a non metallic case back such as glass, ceramic and/or plastic which do not significantly impede radiation. It can also be comprised of a nonmetallic material in the center of the case back and a metallic material on the perimeter of the case back, effectively maintaining the loop configuration. Here again, dial 22 is preferably configured from nonmetallic material to minimize any negative effects to transmission or reception.

It can thus be seen that the present invention provides an improved antenna arrangement for a wristworn device having improved signal transmission and reception functionality. Further, the present invention provides an improved antenna arrangement for a wristworn timepiece that incorporates therein a receiver, transmitter and/or transceiver. Further, the present invention provides an improved antenna arrangement for a wristworn device that reduces the number of components of the device yet provides satisfactory or even improved signal reception and/or transmission. In addition, the present invention provides an improved antenna arrangement that reduces ESD.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention described herein and all statements of the scope of the invention which as a matter of language might fall therebetween.

The invention claimed is:

1. A wristworn device comprising a radio communication device for at least one of receiving signals from and transmitting signals to a communication device external to the wristworn device, the wristworn device comprising:
   a casing comprising a metallic watchcase, a crystal that seals a first end of the watchcase and a case back that seals a second end of the watchcase;
   controller means disposed in said casing and operatively coupled to the radio communication device, and
   wherein the watchcase comprises a slot, and wherein the watchcase is electrically coupled to the radio communication device to function as the antenna for at least one of reception or transmission of signals for the radio communication device.

2. The wristworn device as claimed in claim 1, comprising a display, operatively coupled to the controller means, for displaying information based on the signals received from the radio communications device.

3. The wristworn device as claimed in claim 1, wherein the metallic watch case is tuned to a frequency.

4. The wristworn device as claimed in claim 1, wherein the metallic watch case is tuned to a range of frequencies.

5. The wristworn device as claimed in claim 1, wherein the metallic watch case is left un-tuned.

6. The wristworn device as claimed in claim 1, wherein the case back is selected from the group consisting of a ferrous metal, a non-ferrous metal, a nonmetal, or a combination of metal and nonmetal.

7. The wristworn device as claimed in claim 2, wherein the display comprises a dial assembly and one or more display hands, wherein the dial assembly is comprised of metal or non-metallic materials.

8. The wristworn device as claimed in claim 1, comprising one or more switches for interfacing with the controller means for entering data into or configuring operation of the controller means.

9. A wristworn device comprising a radio communication device for at least one of receiving signals from and transmitting signals to a communication device external to the wristworn device, the wristworn device comprising:
   a casing comprising a metallic watchcase, a crystal that seals a first end of the watchcase and a case back that seals a second end of the watchcase;
   controller means disposed in said casing and operatively coupled to the radio communication device,
   a metallic loop provided in the casing proximate the watchcase, wherein the metallic loop is electrically coupled to the radio communication device to function as the antenna for at least one of reception or transmission of signals for the radio communication device; and
   wherein the watchcase comprises a loop having a slot creating a break in said loop and functions as an element for the reception and/or transmission of electromagnetic radiation.

10. The wristworn device as claimed in claim 9, wherein the metallic loop comprises a single loop of metal.

11. The wristworn device as claimed in claim 9, wherein the metallic loop is tuned to a specific frequency.

12. The wristworn device as claimed in claim 9, wherein the metallic loop is tuned to a range of frequencies.

13. The wristworn device as claimed in claim 9, wherein the metallic loop is left un-tuned.

14. The wristworn device as claimed in claim 9, comprising a display, operatively coupled to the controller means, for displaying information based on the signals received from the radio communications device.

15. The wristworn device as claimed in claim 9, wherein the metallic watch case is tuned to a selected frequency.

16. The wristworn device as claimed in claim 9, wherein the metallic watch case is tuned to a range of frequencies.

17. The wristworn device as claimed in claim 9, wherein the metallic watch case is left un-tuned.

18. The wristworn device as claimed in claim 9, wherein the case back is selected from the group consisting of a ferrous metal, a non-ferrous metal, a nonmetal, or a combination of metal and nonmetal.

19. The wristworn device as claimed in claim 9, wherein the display comprises a dial assembly and one or more display hands, wherein the dial assembly is comprised of metal or non-metallic materials.

20. The wristworn device as claimed in claim 9, comprising one or more switches for interfacing with the controller means for entering data into or configuring operation of the controller means.

21. A wristworn device comprising a radio communication device for at least one of receiving signals from and transmitting signals to a communication device external to the wristworn device, the wristworn device comprising:
   a casing comprising a metallic watchcase, a crystal that seals a first end of the watchcase and a case back that seals a second end of the watchcase;
   controller means disposed in said casing and operatively coupled to the radio communication device, and
   wherein the watchcase is electrically coupled to the radio communication device to function as the antenna for at least one of reception or transmission of signals for the radio communication device.

22. The wristworn device as claimed in claim 21, comprising a display, operatively coupled to the controller means, for displaying information based on the signals received from the radio communications device.

23. The wristworn device as claimed in claim 21, wherein the metallic watch case is tuned to a selected frequency.

24. The wristworn device as claimed in claim 21, wherein the metallic watch case is tuned to a range of frequencies.

25. The wristworn device as claimed in claim 21, wherein the metallic watch case is left un-tuned.

26. The wristworn device as claimed in claim 21, wherein the case back is selected from the group consisting of a ferrous metal, a non-ferrous metal, a nonmetal, or a combination of metal and nonmetal.

27. The wristworn device as claimed in claim 21, wherein the display comprises a dial assembly and one or more display hands, wherein the dial assembly is comprised of metal or non-metallic materials.

28. The wristworn device as claimed in claim 21, comprising one or more switches for interfacing with the controller means for entering data into or configuring operation of the controller means.

* * * * *